July 11, 1967 K. A. RAYPHOLTZ 3,330,444
PLUNGER TYPE DISPENSING DEVICE
Filed April 7, 1966 2 Sheets-Sheet 1

INVENTOR.
KENNETH A. RAYPHOLTZ

BY Woodland, Weihart, Earhardt & Naughton
Attorneys

July 11, 1967  K. A. RAYPHOLTZ  3,330,444
PLUNGER TYPE DISPENSING DEVICE
Filed April 7, 1966  2 Sheets-Sheet 2

INVENTOR.
KENNETH A. RAYPHOLTZ
BY Woodard, Weikart, Emhardt & Naughton
Attorneys

United States Patent Office 3,330,444
Patented July 11, 1967

3,330,444
PLUNGER TYPE DISPENSING DEVICE
Kenneth A. Raypholtz, Silver Lake, Ind., assignor to Demco, North Manchester, Ind.
Filed Apr. 7, 1966, Ser. No. 540,875
3 Claims. (Cl. 222—137)

This invention relates generally to plunger or piston operated dispensers and in particular to multi-tube dispensing devices for simultaneously ejecting proportional amounts of separated fluids.

In the use of certain fluids, such as epoxy resins, it is necessary to initially mix the resin and the activator or catalyst in proper proportion and then apply the mixture to the work surface, and this mixing of the components must occur closely prior to application of the mixture to the work. Conventionally, the resin and activator are sold in separate containers and are hand mixed just before use. The difficulties in measuring out the proper proportions and the general inconvenience of this method are obvious.

It is the primary object of the present invention to provide a dispenser for ejecting measured amounts of separate fluids, the fluids being separated while in the dispenser thereby permitting the dispenser itself to be used as a storage or point-of-sale container.

A further object of the present invention is to provide a mixing nozzle for a multi-tube dispenser which permits the application of a mixture of the dispenser contents directly to a work surface.

A further object of the present invention is to provide a power head attachment for the dispensing device referred to above which permits hydraulic or pneumatic operation of the dispenser.

These and other objects will become apparent as the description proceeds with reference to the accompanying drawings in which.

Figure 1:
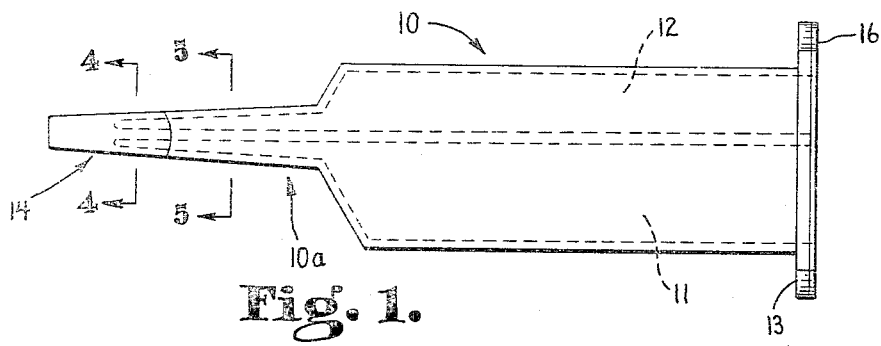
FIG. 1 is a side view of a multi-fluid dispenser body portion embodying the present invention.
Figure 3:
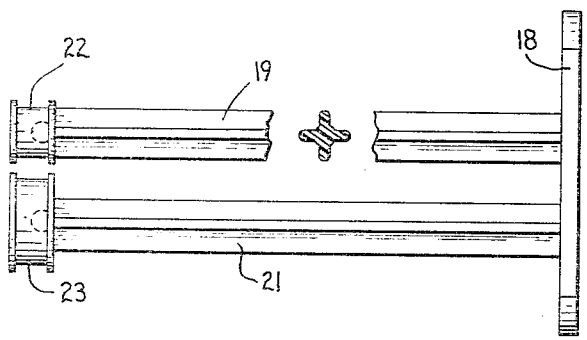
FIG. 3 is a side view of the piston assembly adapted for insertion into the body portion shown in FIG. 1.
Figure 2:
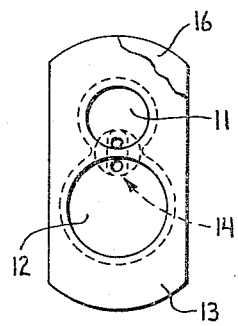
FIG. 2 is an end view of the structure of FIG. 1.

Referring initially to FIGS. 1, 2 and 3, there is shown at 10 the body of a multi-fluid dispenser, the body having parallel bores 11 and 12 extending therethrough. A flange 13 is formed in the body normal to the axes of the bores and having apertures registering with the bores 11 and 12 of the housing.

Figure 4:
FIG. 4 is a sectional view taken generally along the line 4—4 of FIG. 1.

The end portion of the body 10a opposite the flange 13 tapers to a reduced cross section with the tip 14 having a flattened configuration as indicated in FIG. 4. The bores 11 and 12 have decreasing diameters in the tapering end portion 10a of the body and terminate at the flattened body tip. The body portion of the dispenser is thereby adapted to have its bores 11 and 12 filled with two fluids to be ejected and, when filled, the body portion may be sealed by a closure indicated at 16 in FIG. 1. The closure 16 may preferably take the form of a thin polyethylene sheet adhered to the face of the flange 13.

Referring primarily to FIG. 3, the piston assembly adapted to be inserted into the body bores 11 and 12, when the contents of the bores are to be ejected, includes a plate 18 which matches the body flange 13 in general size and configuration. Extending from one face of plate 18 are plunger rods 19 and 21, generally cross shaped in cross-section, and removably attached by ball-and-socket connection to the ends of the rods are pistons 22 and 23. The pistons 22 and 23 are sized so as to be slidable within the bores 12 and 11, respectively.

Manual operation of the multi-fluid dispenser can be accomplished by either peeling off or piercing the sealing flap 16 and inserting the pistons 22 and 23 into the bores. The flattened, solid tip portion of the body 10 may be sheared or cut away, opening the bores 11 and 12. Thereafter, pressure may be applied to the plate 18, moving it toward the flange 13 and ejecting the fluid in the bores in two streams upon the work surface or the mixing surface. The flattened configuration of the tapered end portion 10a of the body aids in depositing or ejecting the fluids in the precise location desired. The generally similar configuration of the plate 18 and the flange 13 aids in accomplishing the finger-actuated plunger movement necessary to eject the fluids.

Figure 8:
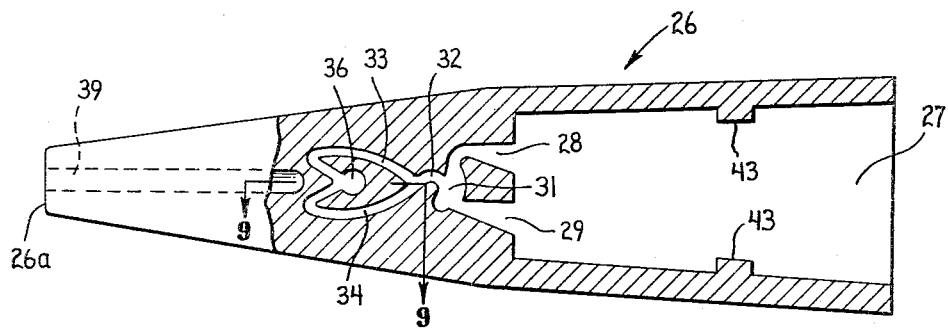
FIG. 8 is a side, sectional view of the mixer attachment adapted to cooperate with the body portion of FIG. 1.
Figure 9:
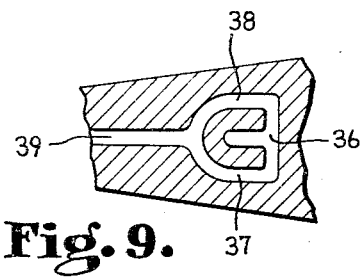
FIG. 9 is a fragmentary, enlarged sectional view taken generally along the line 9—9 of FIG. 8.

It will be understood that in the operation described above the fluids will be deposited in streams, side-by-side, but admixed, upon the work surface or mixing surface. A mixer attachment or nozzle, adapted to be inserted on the end of the body 10, will now be described with primary reference to FIG. 8. The mixer attachment includes a body 26 having a central bore 27 tapered to receive the tip-severed end portion 10a of the dispenser body. At the end of the bore 27 the body 26 has formed therein spaced passages 28 and 29. The passages 28 and 29 register with the ends of the bores 12 and 11, respectively, of the dispenser body, and the passages join in a somewhat heart-shaped plenum chamber 31. An outlet passage 32 extending from the plenum chamber divides into two branches 33 and 34. These branches merge in a plenum chamber 36 and again redivide into two branches 37 and 38 (FIG. 9). The branches 37 and 38 merge into a single outlet passage 39 which is open at the mixer body tip 26a.

Figure 5:
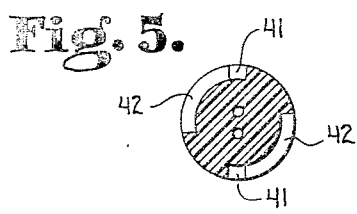
FIG. 5 is a sectional view taken generally along the line 5—5 of FIG. 1.
Figure 6:
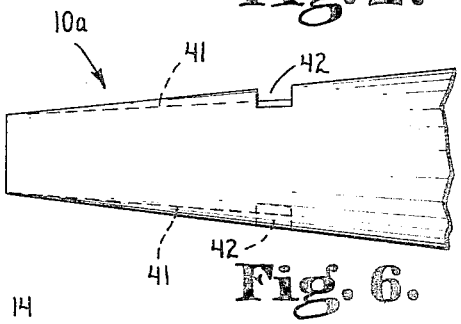
FIG. 6 is a fragmentary, enlarged side view of the tapering end portion of the dispenser body shown in FIG. 1.
Figure 7:
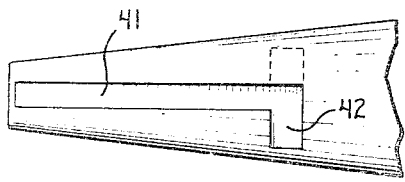
FIG. 7 is a fragmentary, enlarged top plan view of the structure shown in FIG. 6.

A means for locking the dispenser body 10 on the mixer attachment body 26 may take the form of two, diametrically-opposite grooves 41 and 42 (FIG. 6) formed in the tapered end portion 10a of the dispenser body. As may best be seen in FIGS. 5 and 7, the grooves 41 communicate with arcuate grooves 42 formed in the tip portion 10a. The grooves 41 and 42 cooperate with internal lugs 43 (FIG. 8) formed in the body portion 26 of the mixing attachment. The tapered end portion 10a of the dispenser body 10 may be inserted into the bore 27 of the mixer attachment with the lugs 43 traversing the axial grooves 41. A slight rotation of the dispenser body 10 with relation to the mixer body 26 serves to move the lugs 43 into the arcuate grooves 42 locking the mixer nozzle on the dispenser body.

Upon manual operation of the dispenser, fluid will be forced into the passages 29 and 28, the turbulence provided by the dividing and merging of the fluid passageways serves to effectively mix two fluids and the compound ejected from the tip 26a of the mixer will be a homogeneous blending of the two fluids ejected from the dispenser bores 11 and 12.

Figure 10:
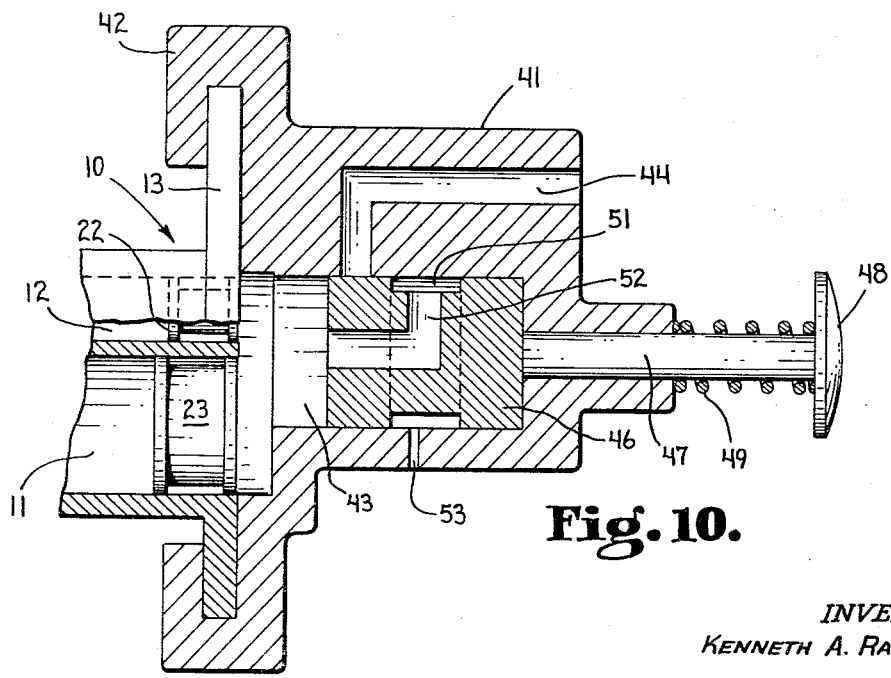
FIG. 10 is a side, sectional view of a fluid, actuated operating attachment for the dispenser body of FIG. 1.

Referring primarily to FIG. 10, a fluid-actuated operating attachment for the dispenser body of FIG. 1 will now be described. The attachment includes a cup-shaped housing 41 having a bracket portion 42 which is twist-locked over the flange 13 of the body portion 10 of the dispenser. Before the housing 41 is installed on the flange 13, the seal flap 16 is removed from the flange and pistons 22 and 23, removed from their rods 19 and 21, are placed in the bores 12 and 11 as free pistons. The housing 41 is provided with an elongated chamber 43 which communicates with each of the dispenser body bores.

The housing 41 is further provided with a passage 44 adapted to deliver fluid under pressure to the elongated chamber 43 from a source of fluid pressure, such as a compressed air tank or reservoir (not shown). Movable within the chamber 43 is a valving member 46, attached to a plunger stem 47 which extends to the exterior of the housing. The stem is capped by a thumb button 48 and a compression spring 49 urges the rod 47 and the valving member 46 into its position of FIG. 10. The valving member is provided with an annular groove 51 which communicates with an L-shaped passage 52 in the valving member. A vent passage 53 is formed in the side of the housing 41 and serves to vent the groove 51 and surrounding areas when the valving member is in its position of FIG. 10.

In operation, with a source of fluid under pressure connected to the passage 44, while the valving member 46 is in its position of FIG. 10 the passage 44 will be obstructed by the member 46. Upon depression of the thumb button 48 the valving member will be moved leftwardly until the groove 51 (and passage 52) communicate with the passage 44. The introduction of fluid pressure on the working faces of the pistons 22 and 23 will serve to move the pistons leftwardly ejecting fluid from the bores in the fashion previously described. When the button 48 is released, the spring 49 will return the valving member 46 to its position of FIG. 10, again obstructing the passage 44 and providing communication between the groove 51 and the vent 53 thereby releasing any trapped, residual pressure in the passages 22, 23, 52 and 53.

It will be understood that the fluid pressure operated attachment can be utilized for larger, commercial size dispensers and provides capability for ejecting relatively large amounts of fluids of relatively heavy viscosities. The venting of the housing 41 to atmosphere through the vent 53 upon release of the button 48 permits a slight springing back of the pistons because of the resilient properties of the fluids ejected and this prevents any after drip from the dispenser tip. The bores 11 and 12 may be of the same or differing diameters, this determining the component ratio of the material ejected.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A multi-fluid dispenser comprising a body having a plurality of parallel bores therein, a flange normal to the axes of said bores at one end of said body, the end portion of said body opposite said flange tapering to a reduced cross-section with the tip having a flattened configuration, said bores having decreasing diameters in said tapering end portion of the body and terminating in said flattened body tip, said bores being thereby adapted to be filled with fluid and sealed by a closure extending over the open ends of the bores adhered to said flange and to be opened at the opposite end of the body by severing a portion of said flattened body tip, a piston assembly adapted to be inserted into said body bores when their contents are to be ejected, said piston assembly comprising a plate matching said body flange in general size and configuration, plunger rods extending from one face of said plate, pistons detachably secured to the tips of said rods, the pistons being sized so as to be slidable within the body bores, whereby upon insertion of said piston assembly within said body and severing of said tapered body end, the contents of said bores may be ejected from the tapered ends of the bores by moving said plunger plate toward said body flange.

2. A multi-fluid dispenser comprising a body having a plurality of parallel bores therein, a flange normal to the axes of said bores at one end of said body, the end portion of said body opposite said flange tapering to a reduced cross-section with the tip having a flattened configuration, said bores having decreasing diameters in said tapering end portion of the body and terminating in said flattened body tip, said bores being thereby adapted to be filled with fluid and sealed by a closure extending over the open ends of the bores adhered to said flange and to be opened at the opposite end of the body by severing a portion of said flattened body tip, a piston assembly including pistons disposed at the outer ends of said dispenser body bores, a fluid-actuated operating attachment having a cup-shaped housing attached to said dispenser flange, an elongated chamber within said operating attachment housing communicating with each of said dispenser body bores, a passage in said housing adapted to deliver fluid under pressure to said elongated chamber, a valving member manually movable within said chamber for obstructing said fluid passage at one of its positions and opening said fluid passage to said chamber at the other of its positions, and means biasing said valving member into its passage-obstructing position, whereby manual movement of said valving member to its said other position admits fluid under pressure to said elongated chamber and drives said pistons into said dispenser bores to eject the dispenser contents therefrom.

3. A multi-fluid dispenser as claimed in claim 2 in which the elongated chamber in the body of the operating attachment is vented to atmosphere with said vent being obstructed by said valving member when in its said other position.

References Cited

UNITED STATES PATENTS

| | | | |
|---|---|---|---|
| 2,446,501 | 8/1948 | Weber | 222—389 |
| 2,952,861 | 9/1960 | Reggio | 222—541 X |
| 3,117,696 | 1/1964 | Herman et al. | 222—137 |
| 3,156,380 | 11/1964 | Kuechenmeister | 222—153 X |
| 3,159,312 | 12/1964 | Van Sciver | 222—387 X |
| 3,166,221 | 1/1965 | Nielson | 222—137 |
| 3,169,665 | 2/1965 | Colley | 222—5 |
| 3,248,014 | 4/1966 | Gill | 222—137 |

FOREIGN PATENTS

| | | |
|---|---|---|
| 793,277 | 1/1956 | England. |
| 956,454 | 8/1958 | Germany. |

ROBERT B. REEVES, *Primary Examiner.*

N. L. STACK, *Assistant Examiner.*